United States Patent
Keoshkerian et al.

(10) Patent No.: US 9,109,067 B2
(45) Date of Patent: Aug. 18, 2015

(54) BLANKET MATERIALS FOR INDIRECT PRINTING METHOD WITH VARYING SURFACE ENERGIES VIA AMPHIPHILIC BLOCK COPOLYMERS

(71) Applicant: XEROX CORPORATION, Norwalk, CT (US)

(72) Inventors: Barkev Keoshkerian, Thornhill (CA); Michelle N. Chretien, Mississauga (CA); Daryl W. Vanbesien, Burlington (CA); Marcel P. Breton, Mississauga (CA); Jennifer L. Belelie, Oakville (CA); Naveen Chopra, Oakville (CA)

(73) Assignee: XEROX CORPORATION, Norwalk, CT (US)

(*) Notice: Subject to any disclaimer, the term of this patent is extended or adjusted under 35 U.S.C. 154(b) by 86 days.

(21) Appl. No.: 14/035,151

(22) Filed: Sep. 24, 2013

(65) Prior Publication Data

US 2015/0085042 A1    Mar. 26, 2015

(51) Int. Cl.
C08F 259/08 (2006.01)
B41J 2/005 (2006.01)

(52) U.S. Cl.
CPC ............ *C08F 259/08* (2013.01); *B41J 2/0057* (2013.01)

(58) Field of Classification Search
None
See application file for complete search history.

(56) References Cited

U.S. PATENT DOCUMENTS

| | | |
|---|---|---|
| 3,590,000 A | 6/1971 | Palermiti et al. |
| 3,655,374 A | 4/1972 | Palermiti et al. |
| 3,720,617 A | 3/1973 | Chatterji et al. |
| 3,983,045 A | 9/1976 | Jugle et al. |
| 5,389,958 A | 2/1995 | Bui et al. |
| 6,004,714 A | 12/1999 | Ciccarelli et al. |
| 6,190,815 B1 | 2/2001 | Ciccarelli et al. |
| 6,593,049 B1 | 7/2003 | Veregin et al. |
| 6,756,176 B2 | 6/2004 | Stegamat et al. |
| 6,830,860 B2 | 12/2004 | Sacripante et al. |
| 7,329,476 B2 | 2/2008 | Sacripante et al. |
| 7,494,757 B2 | 2/2009 | Sacripante et al. |
| 7,695,884 B2 | 4/2010 | Vanbesien et al. |
| 7,749,673 B2 | 7/2010 | Zhou et al. |
| 7,968,266 B2 | 6/2011 | Field et al. |
| 8,192,913 B2 | 6/2012 | Faucher et al. |
| 2008/0312377 A1* | 12/2008 | Schmidt et al. .............. 525/88 |

* cited by examiner

*Primary Examiner* — Stephen Meier
*Assistant Examiner* — Renee I Wilson
(74) *Attorney, Agent, or Firm* — Pillsbury Winthrop Shaw Pittman LLP

(57) ABSTRACT

An intermediate transfer member containing a multi-block copolymer containing at least an A block and a B block, wherein the A block has a higher surface energy than the B block, and a method of forming an intermediate transfer member. A method of printing an image to a substrate including applying an ink onto the intermediate receiving member using an inkjet printhead; spreading the ink onto the intermediate receiving member; inducing a property change of the ink; and transferring the ink to a substrate.

17 Claims, 1 Drawing Sheet

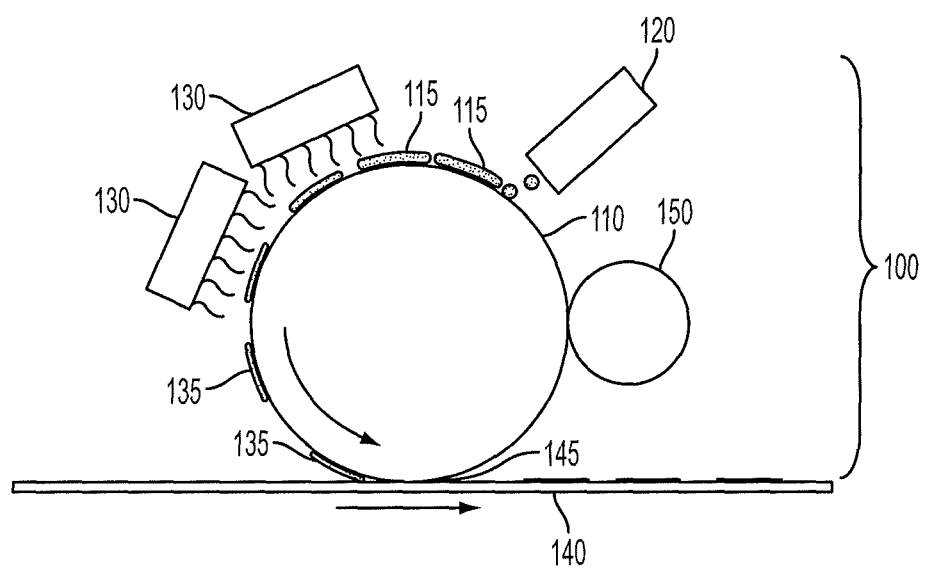

BLANKET MATERIALS FOR INDIRECT PRINTING METHOD WITH VARYING SURFACE ENERGIES VIA AMPHIPHILIC BLOCK COPOLYMERS

TECHNICAL FIELD

The present disclosure is generally related to indirect printing methods, and more specifically, to intermediate transfer members and printing processes involving intermediate transfer members.

BACKGROUND

Indirect printing methods generally include a two-step printing process including applying ink imagewise onto an intermediate transfer member, such as a drum or a belt, using an inkjet printhead, and then transferring a transient image to a substrate. After the ink is applied imagewise onto the intermediate transfer member, the ink wets or spreads on the intermediate transfer member to form a transient image. The transient image undergoes a change in properties, such as partial or complete drying, thermal or photo-curing or gelation, and is then transferred to the substrate.

Intermediate transfer members, also known as transfix belts or transfer blankets, for use in an indirect printing method are designed to satisfy a range of requirements, including wetting aqueous ink drops, heat absorption for water removal, and transfer of dried ink to the final substrate to give a clean plate.

Particularly, intermediate transfer members for use in indirect printing must meet specific sub-system requirements that are unique to the inkjet/transfix printing architecture. The intermediate transfer member desirably exhibits surface properties, such as energy, topology, and so forth, to enable wetting of the ink and subsequently, such as after the phase-change, to enable complete transfer of the transient image onto a substrate. Generally, intermediate transfer member materials that display good wettability do not sufficiently transfer the ink film onto a substrate, or conversely, do not sufficiently wet the ink but do transfer efficiently to the substrate.

SUMMARY

Provided is an intermediate transfer member comprising a composition comprising a multi-block copolymer containing at least an A block and a B block, wherein the A block has a higher surface energy than the B block.

Also provided is a method comprising forming an intermediate transfer member by preparing a block copolymer having at least an A block and a B block, wherein the A block has a higher surface energy than the B block.

Additionally provided is a method of printing an image to a substrate comprising applying an ink onto an intermediate receiving member using an inkjet printhead; spreading the ink onto the intermediate receiving member; inducing a property change of the ink; and transferring the ink to a substrate, wherein the intermediate transfer member comprises a composition comprising a block copolymer having an A block and a B block; and the A block has a higher surface energy than the B block.

BRIEF DESCRIPTION OF THE DRAWINGS

FIGURE is a schematic representation of a two-step printing process.

EMBODIMENTS

In this specification and the claims that follow, singular forms such as "a," "an," and "the" include plural forms unless the content clearly dictates otherwise. All ranges disclosed herein include, unless specifically indicated, all endpoints and intermediate values. In addition, reference may be made to a number of terms that shall be defined as follows:

"Optional" or "optionally" refer, for example, to instances in which subsequently described circumstances may or may not occur, and include instances in which the circumstance occurs and instances in which the circumstance does not occur.

The phrases "one or more" and "at least one" refer, for example, to instances in which one of the subsequently described circumstances occurs, and to instances in which more than one of the subsequently described circumstances occurs.

As used herein, the modifier "about" used in connection with a quantity is inclusive of the stated value and has the meaning dictated by the context (for example, it includes at least the degree of error associated with the measurement of the particular quantity). When used in the context of a range, the modifier "about" should also be considered as disclosing the range defined by the absolute values of the two endpoints. For example, the range "from about 2 to about 4" also discloses the range "from 2 to 4."

"Room temperature" refers to a temperature of from about 20° C. to about 30° C., such as from about 20° C. to about 24° C., or from about 23° C. to about 27° C., or from about 26° C. to about 30° C.

An intermediate transfer member of this disclosure comprises a composition comprising a block copolymer, wherein a first block of the block copolymer has a higher q surface energy than the second block of the block copolymer. Using a composition comprising such a block copolymer results in an intermediate transfer member having suitable wetting and transfer properties.

Indirect Printing

Images may be applied to a substrate using a two-step printing process. An exemplary offset or indirect printing process is disclosed in U.S. Pat. No. 5,389,958, the entire disclosure of which is totally incorporated herein by reference.

As shown in the FIGURE, a two-step printing process may include applying an ink imagewise onto an intermediate transfer member 110, such as a drum or a belt, using an inkjet printhead 120, wetting/spreading the ink on the intermediate transfer member 110 to form the transient image 115, inducing a property change in the transient image using a property-change device 130, and transferring the post-phase-change transient image 135 to the substrate 140. The substrate 140 may be fed to a nip region 145 in the direction of the arrow. A cleaning unit 150 may clean the intermediate transfer member 110 of any residual ink, dust, or other materials after transfer of the ink images has been completed.

Intermediate Transfer Member

An intermediate transfer member suitable for the above-two step printing process desirably has surface properties (such as energy, topology, and so forth) both to enable wetting of the ink and to enable complete transfer of the transient image (residual ink film along with pigment) onto a substrate. For the ink to wet well (i.e., spread) onto the intermediate transfer member, the surface free energy of the intermediate transfer member is desirably higher than the surface tension of the liquid ink. For the ink to subsequently be transferred from the intermediate transfer member to the substrate, the surface free energy of the intermediate transfer member is desirably lower than the surface free energy of the dry (resin) ink. Thus, the surface free energy of the intermediate transfer member desirable for wetting the ink may be different from the surface free energy desirable for transferring the ink image to the substrate.

As a general matter, the wettability or spread of a liquid on a surface is governed by the forces of interaction between the liquid, the surface, and the surrounding air, and in particular the surface free energy, as relating to the surface chemistry and surface topology. Surface tension is a parameter that can be described as the interaction between the forces of cohesion and the forces of adhesion, which determines whether or not wetting, or the spreading of liquid across a surface, occurs.

Young's Equation, which defines the balance of forces caused by a wet drop on a dry surface, stipulates that:

$$\gamma_{SL} + \gamma_{LV} \cos\theta = \gamma_{SV}$$

where $\gamma_{SL}$=forces of interaction between a solid and liquid; $\gamma_{LV}$=forces of interaction between a liquid and surrounding air; $\gamma_{SV}$=forces of interaction between a solid and surrounding air; and $\theta$=contact angle of the drop of liquid in relation to the surface. Young's Equation also shows that, if the surface tension of the liquid is lower than the surface energy, the contact angle is zero and the liquid wets the surface. The surface energy depends on several factors, such as the chemical composition and crystallographic structure of the solid, and in particular of its surface, the geometric characteristics of the surface and its roughness, and the presence of molecules physically adsorbed or chemically bonded to the solid surface.

A suitable intermediate transfer member comprises a multi-block copolymer having blocks of differing surface energies. For example, a block copolymer may be an A/B block copolymer, wherein the A block has a relatively higher surface energy and the B block has a relatively lower surface energy. When the block copolymer is cast into film, the blocks phase separate into different domains having different surface energies. The domains that have the relatively higher surface energies may be hydrophilic, while the domains having the relatively lower surface energies may be hydrophobic. Thus, the higher surface energy domains may enable wetting of the ink, while the lower surface energy domains may enable transferring of the ink to the substrate.

The domain sizes may vary from nanometers to microns. So that the intermediate transfer member may enable wetting and transfer, the dimensions of the domains of lower and higher surface energy may be smaller than the dimensions of an ink drop. Generally, the dimensions of an ink drop on the intermediate transfer member may vary from a diameter of about 10 to about 200 μm, such as from about 30 to about 60 μm, or from about 45 to about 80 μm, or from about 75 to about 100 μm, or from about 30 to 100 μm, or from about 40 to about 80 μm. Accordingly, the dimensions of the domains of low and high surface energy may be less than about 30 μm, such as from about 1 μm to about 15 μm, or from about 10 μm to about 25 μm, or from about 20 μm to about 30 μm.

Block Copolymers

Multi-block copolymers may be produced by any known means. For example, the block copolymers may be produced using ring-opening polymerization. As described in copending U.S. patent application Ser. No. 13/938,874, ring-opening polymerization generally is a form of chain-growth polymerization in which the terminal end of a polymer acts as a reactive center and further cyclic monomers join to form a larger polymer chain through ionic propagation. Alternatively, block copolymers may be produced by other synthetic methods, such as free radical polymerizations or condensation polymerizations.

Suitable block copolymers have a surface free energy of from about 15 to about 70 mN/m, such as from about 19 to about 30 mN/m, or from about 24 to about 42 mN/m, or from about 38 to about 50 mN/m.

The multi-block copolymer may be an A/B copolymer, wherein the A block has a higher surface energy than the B block. The surface energy difference between the two or more block copolymer segments may be in the range of from about 5 to about 25 mN/m, such as from about 10 to about 20 mN/m, or from about 10 to about 14 mN/m, or from about 12 to about 17 mN/m, or from about 16 to about 20 mN/m. Moreover, when the jetted ink droplet has a surface energy lower than the B block and the dried polymer has a higher surface energy than the A block, sufficient pinning of the ink droplet and sufficient release of the dried polymer will be enabled. As an example, the surface energy of the A block may be greater than about 40 mN/m, such as from about 50 to about 80 mN/m, or from about 50 to about 65 mN/m, or from about 60 to about 75 mN/m, or from about 70 to about 80 mN/m. The surface energy of the B block may be from about 15 to about 30 mN/m, such as from about 15 to about 20 mN/m, or from about 18 to about 26 mN/m, or from about 24 to about 30 mN/m.

Suitable monomers for the A block include hydrophilic materials, styrenes, amines, esters, acrylates, methacrylates, urethanes, ureas, and the like.

Suitable monomers for the B block include hydrophobic materials, fluorinated materials, such as pentafluorostyrene, perfluoro monomers, aliphatic monomers, and the like.

The domain size and frequency is dependent on the block composition and the block length. Thus, the block lengths of the block copolymer may be tailored to give varying domain sizes that can be optimized for ink wetting and release. When the A block is larger than the B block, the domains of high energy may have larger dimensions that the domains of lower energy, and vice versa. To enable suitable wetting and transfer, the lengths of the blocks may be approximately the same.

Method of Making an Intermediate Transfer Member

A composition comprising a multi-block copolymer may be prepared according to any suitable method, as discussed above. For example, a polymer composition may be produced by preparing a block copolymer comprising an A block and a B block, wherein the A block has a higher surface energy than the B block. The composition may undergo blanket coating by dissolving the block into a suitable solvent and then coating onto the substrate to produce the intermediate transfer member. The intermediate transfer member may be cast or surface coated.

Casting involves pouring the composition into a mold, and then removal of the solvent.

The composition may be deposited on a substrate. Any suitable substrate may be used, such as metals, rubbers, and fabrics. Suitable metals include steel, aluminum, nickel, and their alloys, and like metals and alloys of like metals. Suitable rubbers include ethylene propylene dienes, fluoroelastomers, n-butyl rubbers, silicone rubbers, other elastomers, and the like. A suitable fabric material refers to a textile structure comprised of mechanically interlocked fibers or filaments, which may be woven or nonwoven. Fabrics are materials made from fibers or threads and woven, knitted, or pressed into a cloth or felt type structures. Woven refers to closely oriented by warp and filler strands at right angles to each other. Nonwoven refers to randomly integrated fibers or filaments. Suitable fabrics include woven or nonwoven cotton fabric, graphite fabric, fiberglass, woven or nonwoven polyimide (for example, KEVLAR™, available from DuPont), woven or nonwoven polyamide, such as nylon or polyphenylene isophthalamide (for example, NOMEX™, of E. I. DuPont of Wilmington, Del.), polyester, aramids, polycarbonate, polyacryl, polystyrene, polyethylene, polypropylene, cellulose, polysulfone, polyxylene, polyacetal, and the like, and mixtures thereof. The substrate may have a thickness of from about 0.5 to about 70 mm, such as from about 1 to about 30 mm, or from about 25 to about 55 mm, or from about 50 to about 70 mm.

The composition may be deposited on the substrate by any suitable process, such as draw-down coating, spray coating, spin coating, flow coating, dipping, spraying such as by multiple spray applications of very fine thin films, casting, web-coating, roll-coating, extrusion molding, laminating, or the like. The thickness of the surface coating may be from about 5 to about 500 microns thick, such as from about 5 to about 200 microns, or from about 150 to about 400 microns, or from about 300 to about 500 microns. The surface coating may then be accomplished by removal of the solvent Ink Materials Any ink suitable for use in an indirect printing method may be used. Suitable ink compositions include phase change inks, gel based inks, curable inks, aqueous inks, latex inks, and solvent inks. The ink composition may include a resin, colorants, waxes, and other additives. The term "ink composition" refers, for example, to all colors of a particular ink composition including, for example, usable color sets of an ink composition. For example, an ink composition may refer to a usable color set of phase change ink that includes cyan, magenta, yellow, and black inks. Therefore, as defined herein, cyan phase change ink and magenta phase change ink are different ink colors of the same ink composition.

The term "phase change ink," also referred to as "solid ink," refers to inks that remain in a solid phase at ambient temperature and that melt to a liquid phase when heated above a threshold temperature, referred to in some instances as a melt temperature. The ambient temperature is the temperature of the air surrounding the imaging device; however, the ambient temperature may be at room temperature (about 20° C. to about 25° C.) when the imaging device is positioned in an enclosed or otherwise defined space. Melt temperatures for phase change ink may be, for example, from about 70° C. to about 140° C., such as from about 70° C. to about 95° C., or from about 80° C. to about 120° C., or from about 110° C. to about 140° C. When phase change ink cools below the melt temperature, the ink returns to the solid phase.

As used herein, the terms "gel ink" and "gel based ink" refer to inks that remain in a gelatinous state at the ambient temperature and that may be heated or otherwise altered to have a different viscosity suitable for ejection by a printhead. Gel ink in the gelatinous state may have a viscosity, for example, between from about $10^5$ and $10^7$ centipoise (cps); however, the viscosity of gel ink may be reduced to a liquid-like viscosity by heating the ink above a threshold temperature, referred to as a gelation temperature. The gelation temperature may be, for example, from about 30° C. to about 50° C., such as from about 30° C. to about 38° C., or from about 36° C. to about 44° C., or from about 42° C. to about 50° C. The viscosity of the gel ink increases when the ink cools below the gelation temperature.

Some ink compositions, referred to herein as curable inks, may be cured by the imaging device. As used herein, the process of "curing" ink refers to curable compounds in an ink undergoing an increase in molecular weight in response to being exposed to radiation. Exemplary processes for increasing the molecular weight of a curable compound include, for example, crosslinking and chain lengthening. Cured ink is suitable for document distribution, is resistant to smudging, and may be handled by a user. Radiation suitable to cure ink may encompass the full frequency (or wavelength) spectrum including, for example, microwaves, infrared, visible, ultraviolet, and x-rays. For instance, ultraviolet-curable gel ink, referred to herein as UV gel ink, becomes cured after being exposed to ultraviolet radiation. As used herein, the term "ultraviolet" radiation encompasses radiation having a wavelength of from about 50 nm to about 500 nm.

Any suitable resin may be used to form the ink composition. Suitable resins include polyester resins, including the resins described in U.S. Pat. Nos. 6,593,049 and 6,756,176, the entire disclosures of which are totally incorporated herein by reference. Suitable crystalline polyester resins include those known in the art, such as those disclosed in U.S. Pat. No. 8,192,913, the entire disclosure of which is totally incorporated herein by reference. Suitable crystalline polyester resins also include those disclosed in U.S. Pat. Nos. 7,329,476; 7,494,757; 7,968,266; 7,749,673; and 7,695,884, the entire disclosures of which are totally incorporate herein by reference. Suitable resins may also include a mixture of at least one amorphous polyester resin and a crystalline polyester resin, as described in U.S. Pat. No. 6,830,860, the entire disclosure of which is totally incorporated herein by reference Suitable colorants or pigments include pigment, dye, mixtures of pigment and dye, mixtures of pigments, mixtures of dyes, and the like. For simplicity, the term "colorant" refers to colorants, dyes, pigments, and mixtures, unless specified as a particular pigment or other colorant component. The colorant may comprise a pigment, a dye, mixtures thereof, carbon black, magnetite, black, cyan, magenta, yellow, red, green, blue, brown, and mixtures thereof, in an amount of about 0.1 to about 35 wt % based upon the total weight of the composition, such as from about 1 to about 25 wt %.

Suitable colorants include those known in the art, such as those disclosed in, for example, U.S. Pat. No. 8,192,913, the entire disclosure of which is totally incorporated herein by reference. The colorant may be present in the ink in an amount ranging from about 1 to about 35 wt % of the ink particles on a solids basis, such as from about 5 to about 25 wt %, or from about 5 to about 15 wt %.

Suitable waxes include either a single type of wax or a mixture of two or more different waxes. A single wax can be added to ink compositions, for example, to improve particular ink properties, such as particle shape, presence and amount of wax on the ink particle surface, charging and/or fusing characteristics, gloss, stripping, offset properties, and the like. Alternatively, a combination of waxes may be added to provide multiple properties to the ink composition.

Suitable waxes include those known in the art, such as, for example, those disclosed in U.S. Pat. No. 8,192,913, the entire disclosure of which is totally incorporated herein by reference. The ink particles may contain the wax in an amount of, for example, from about 1 to about 25 wt % of the ink particles, such as from about 3 to about 20 wt %, or from about 5 to about 15 wt %, or from about 5 to about 12 wt %.

Suitable additives include any additive that enhances the properties of the ink composition. For example, the ink composition may include positive or negative charge control agents. Other additives include organic spacers, color enhancers, and other known ink additives. Surface additives that can be added to the ink compositions after washing or drying include, for example, metal salts, metal salts of fatty acids, colloidal silicas, metal oxides, strontium titanates, combinations thereof, and the like, which additives may each be present in an amount of from about 0.1 to about 10 wt % of the ink, such as from about 0.5 to about 7 wt %. Examples of such additives include, for example, those disclosed in U.S. Pat. Nos. 3,590,000; 3,720,617; 3,655,374; and 3,983,045, the entire disclosures of which are totally incorporated herein by reference. Other additives include zinc stearate and AEROSIL R972® available from Degussa. The coated silicas of U.S. Pat. Nos. 6,190,815 and 6,004,714, the entire disclosures of which are totally incorporated herein by reference, may also be selected in amounts, for example, of from about 0.05 to about 5 wt % of the ink, such as from about 0.1 to about 2 wt %.

An ink suitable for use in the above-described two-step printing process may have surface tension, viscosity, and particle size suitable for use in a piezoelectric inkjet printhead. For example, the surface tension of the jettable ink may be from about 15 to about 50 dynes/cm, such as from about 15 to about 30 dynes/cm, or from about 25 to about 40 dynes/cm, or from about 35 to about 50 dynes/cm. The viscosity of the jettable inks may be, for example, from about 1 to about 30 centipoise (cps) at 30° C., such as from about 1 to about 14 cps, or from about 8 to about 20 cps, or from about 16 to about 30 cps. The particle size of the jettable inks may be less than about 600 nm, such as less than about 300 nm, or less than about 150 nm.

EXAMPLES

The following Examples are intended to be illustrative only and are not intended to limit the scope of the present disclosure. Also, parts and percentages are by weight unless otherwise indicated.

Block Copolymer Formation

To a round bottom flask is added pentafluorostyrene, which is then deoxygenated. A stable free nitroxide (((2,2,6,6-tetramethylpiperidin-1-yl)oxyl), TEMPO) is added to the round bottom flask. An initiator (Vazo 67) is then added to the reaction mixture, and the reaction mixture is heated to 135° C. Polymerization is continued until most of the monomer is consumed. The polymer is then precipitated into methanol to afford a poly(pentafluorostyrene, PPFS) as a white solid.

Styrene monomer is added to the PPFS, which is then deoxygenated followed by heating to 135° C. The reaction mixture is kept at this temperature until most of the monomer is consumed. The material is then precipitated from methanol and isolated to afford a block copolymer of poly(pentafluorostyrene-b-styrene, P(PFS-b-S).

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. An intermediate transfer member comprising a composition comprising:
   a multi-block copolymer containing at least an A block and a B block,
   wherein the A block has a higher surface energy than the B block and further wherein a differential surface free energy between the A block and the B block is from about 5 to about 25 mN/m.

2. The intermediate transfer member of claim 1, wherein the A block has a surface energy of greater than about 40 mN/m.

3. The intermediate transfer member of claim 1, wherein the B block has a surface energy of from about 15 to about 40 mN/m.

4. The intermediate transfer member of claim 1, wherein the A block is selected from the group consisting of functionalized styrenes, acrylates, methacrylates, ureas, and urethanes.

5. The intermediate transfer member of claim 1, wherein the B block is selected from the group consisting of fluorinated monomers, hydrophobic monomers, and aliphatic monomers.

6. The intermediate transfer member of claim 1, wherein a surface free energy of the multi-block copolymer is from about 19 to about 50 mN/m.

7. The intermediate transfer member of claim 1, wherein a length of the A block and a length of the B block are the same.

8. A printing apparatus comprising an intermediate transfer member comprising the composition of claim 1.

9. A method comprising:
   forming an intermediate transfer member by preparing a block copolymer having at least an A block and a B block,
   wherein the A block has a higher surface energy than the B block and further wherein the A block has a surface energy of greater than about 40 mN/m.

10. The method of claim 9, wherein a differential surface free energy between the A block and the B block is from about 5 to about 25 mN/m.

11. The method of claim 9, wherein the B block has a surface energy of from about 15 to about 40 mN/m.

12. The method of claim 9, wherein the intermediate transfer member has a surface free energy of from about 19 to about 50 mN/m.

13. The method of claim 9, wherein the A block is selected from the group consisting of functionalized styrenes, acrylates, methacrylates, urethanes, and ureas.

14. The method of claim 9, wherein the B block is selected from the group consisting of fluorinated monomers, hydrophobic monomers, and aliphatic monomers.

15. A method of printing an image to a substrate comprising:
   applying an ink onto an intermediate receiving member using an inkjet printhead;
   spreading the ink onto the intermediate receiving member;
   inducing a property change of the ink; and
   transferring the ink to a substrate,
   wherein:
   the intermediate transfer member comprises a composition comprising a block copolymer having an A block and a B block; and
   the A block has a higher surface energy than the B block and further wherein the B block has a surface energy of from about 15 to about 40 mN/m.

16. The method of claim 15, wherein a differential surface free energy between the A block and the B block is from about 5 to about 25 mN/m.

17. The method of claim 15, wherein the A block has a surface energy of greater than about 40 mN/m.

* * * * *